Figure 1:
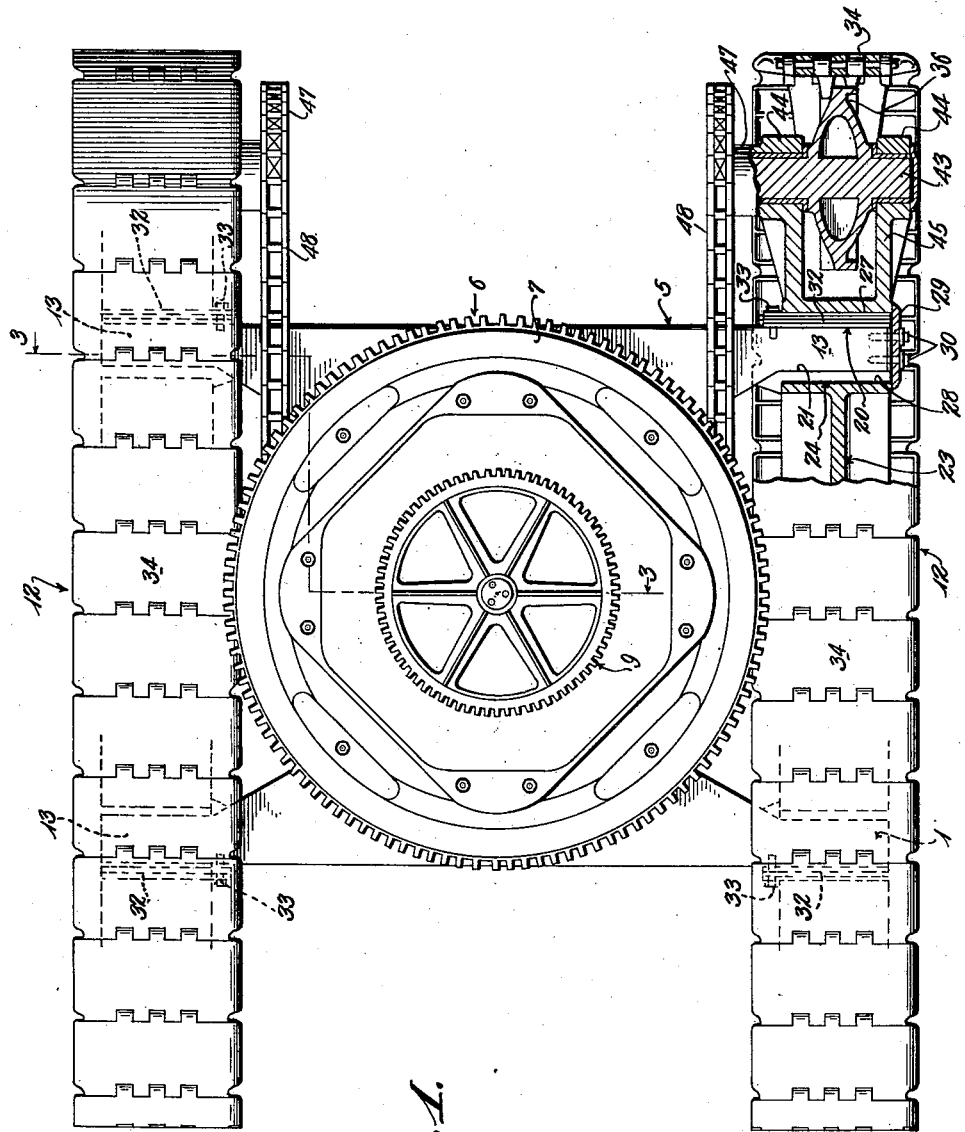

Oct. 15, 1940.                H. N. EKBOM                2,218,258
                          TRAVELING TREAD DRIVE
                         Filed Sept. 18, 1939           3 Sheets-Sheet 1

Inventor
Hilmer N. Ekbom
By L. Donald Myers
Attorney

Patented Oct. 15, 1940

2,218,258

UNITED STATES PATENT OFFICE 2,218,258

TRAVELING TREAD DRIVE

Hilmer N. Ekbom, Chicago, Ill., assignor to Link-Belt Speeder Corporation, a corporation of Illinois Application September 18, 1939, Serial No. 295,528

22 Claims. (Cl. 180—9.1).

This invention relates to new and useful improvements in traveling tread drives.

It is the present practice to mount earth working machines, such as shovels and draglines, and many other types of heavy load handling machines, such as cranes, on traction devices or wheel substitutes of the traveling tread type when such machines are expected to travel over comparatively soft surfaces. Such machines are both propelled and steered by means of the pair of endless traveling tread belts on which they are supported.

When the machines are merely propelled in a straight line, either forwardly or backwardly, both traveling tread belts are driven at the same speed. However, when the machines change their direction of travel or turn around, the separate traveling tread belts are either separately driven, simultaneously driven in the same direction at different speeds, or simultaneously driven in opposite directions. To accomplish such turning or changes in direction of travel, it is essential that the tread belts be independently controlled and driven. This desired result can, of course, be obtained by means of several different approved types of drives. All of such drives include a separately controlled and driven shaft for each traveling tread unit and the shafts usually selected for this purpose are the ones which carry the driving sprocket wheels for the tread belts. As heavy duty roller chains form the most satisfactory driving means for these traveling tread sprocket shafts, the shafts are each provided with a second sprocket wheel over which the drive chain is trained.

From the above statements, it will be seen that each traveling tread unit and its separate drive includes an endless jointed tread belt and an endless transmission chain. As both of these endless devices are subject to wear at the articulating joints for their several links or parts, the devices will elongate and require separate adjustments to effect tightening of the same. Because of the many differences in construction of and duties performed by the tread belt and the drive chain, a single mechanism for simultaneously adjusting both is impractical.

Applicant's prior Patent No. 2,167,039, issued July 25, 1939, discloses the type of adjusting mechanisms which are conventionally employed for effecting independent tightening of the tread belts and drive chains for the two traveling tread units. These mechanisms for each tread belt and its drive consist of two take-up screws for the two bearings which are located at one end of the traveling tread side frame and support the shaft carrying the take-up wheel for the tread belt and two take-up screws for the bearings which are located at the opposite end of the traveling tread side frame and support the shaft carrying the drive sprocket wheel for the tread belt and the driven sprocket wheel for the drive shaft. By means of these respective pairs of take-up screws, the shaft for the tread belt take-up wheel may be adjusted relative to the traveling tread side frame to tighten the tread belt and the shaft for the drive sprocket of the tread belt, and the driven sprocket of the drive chain may be adjusted relative to the traveling tread side frame to tighten the drive chain.

This arrangement of adjusting mechanisms possesses several undesirable characteristics or features, principal among which are—

1. The drive sprocket for the tread belt, the driven sprocket for the drive chain, and the shaft for the same must either be made of one piece or the said sprockets must be keyed to the shaft. It is quite evident that it would be entirely impossible to employ only one take-up screw for effecting adjustment of this unit relative to the traveling tread side frame. For a proper alignment of the double sprocket unit, the axis of the shaft of this unit preferably should be perpendicular to the longitudinal axis of the traveling tread side frame. If correct alignment is not provided and maintained, the drive chain sprocket will be cocked relative to the drive chain itself and will cause rapid wear on the chain and the teeth of the sprocket as this chain and sprocket are close fitted. With the two take-up screws which must be used, it is difficult for the operator to obtain correct alignment, as he necessarily must make two individual or separate adjustments.

2. In also is evident that there is a tremendous strain applied to these take-up screws, as they must necessarily take the combined tension of the traveling tread belt and the drive chain. Because of these severe strains, the take-up screws may be bent or otherwise damaged, thereby disturbing the correct drive alignment.

3. As is explained above, the drive roller chain is tensioned or tightened by adjusting the shaft which carries the driven sprocket for the drive chain and the drive sprocket for the tread belt. Any adjustment of this shaft, therefore, must necessarily vary the tension of the traveling tread belt. It becomes necessary then to adjust the take-up screws at the opposite end of the traveling tread side frame to effect a corresponding adjustment of the shaft for the take-up wheel of the traveling tread so as to loosen the tread belt to the same extent as it is tightened by adjustment of the shaft which carries the drive sprocket for the tread belt.

This invention has for its primary object the provision of a novel combination of adjusting mechanisms for the traveling tread belt and the drive roller chain which will not possess any of the aforementioned undesirable characteristics of the present conventional adjusting mechanisms.

More specifically, this invention has for one of its most important objects the elimination of all take-up screws for effecting adjustment of the double sprocket units to tighten or tension the drive roller chains, and the substitution therefor of mechanism which will enable the said double sprocket unit to be adjusted to tighten the drive roller chain without in any way disturbing the correct alignment of the said unit and without in any way varying the tension or tightness of the traveling tread belt.

A further important object of the invention is to provide a traveling tread frame and double sprocket unit assembly in which the bearings for the shaft of the double sprocket unit will be formed during manufacture so as to assure proper initial alignment of the unit and so as to prevent misalignment at any time during use.

Still another object of the invention is to provide a novel way of mounting the lower frame or base of a crane, shovel, dragline, or the like, on the side frames of traveling tread units.

Other objects and advantages of the invention will be apparent during the course of the following description.

Figure 2:
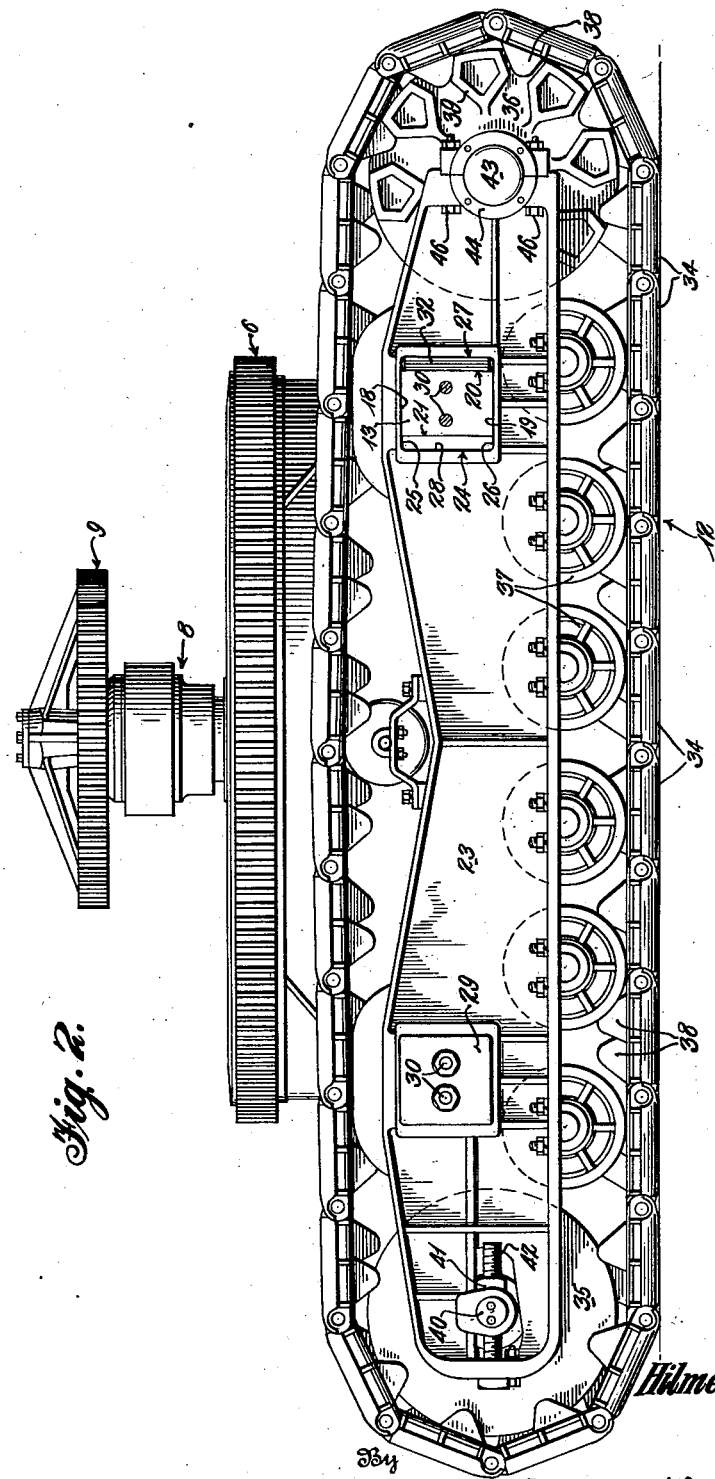
Figure 3:
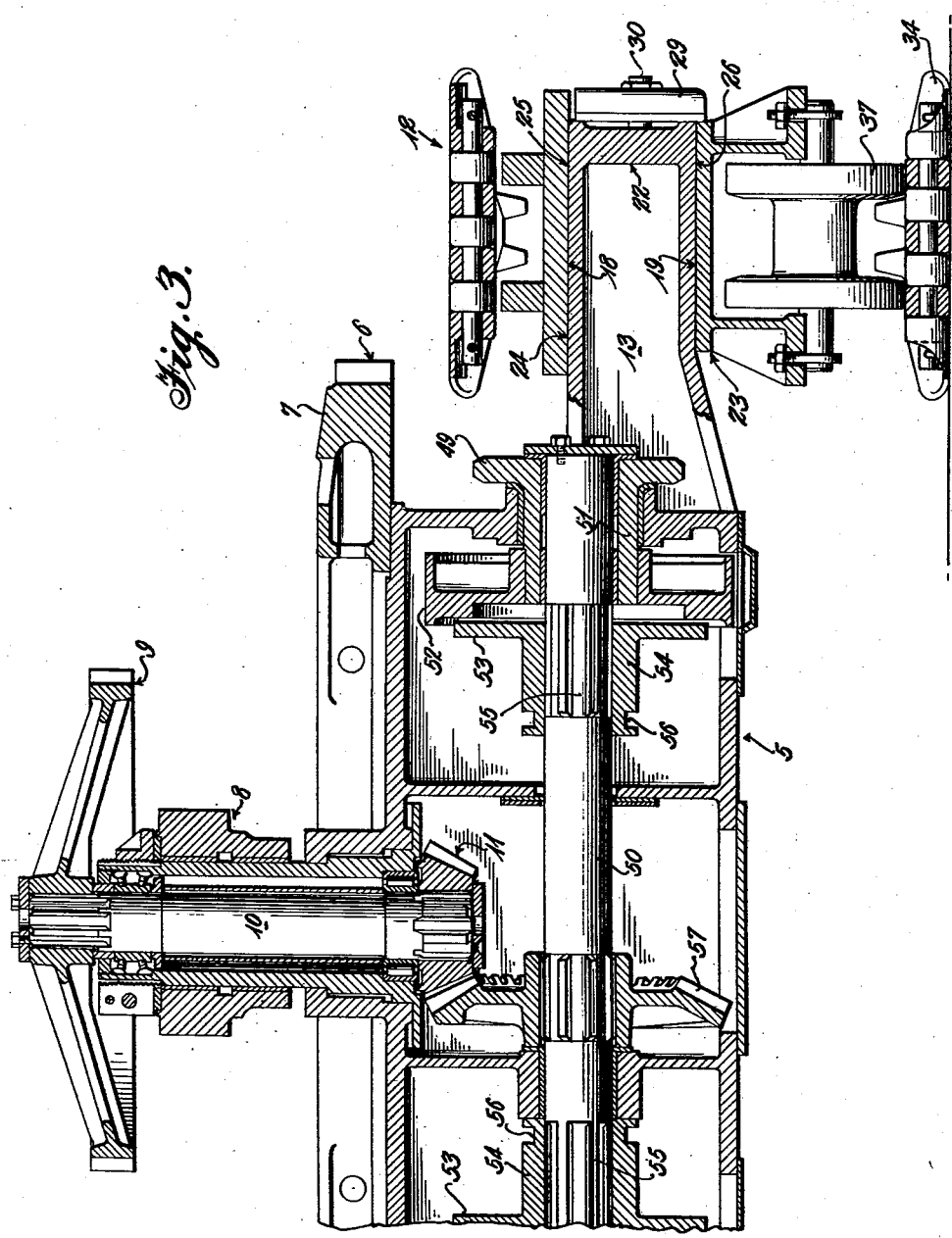

In the accompanying drawings forming a part of this specification and in which like numerals are employed to designate like parts throughout the same, Figure 1 is a plan view, partly in section, of a lower frame or base and its traveling tread unit which is suitable for swingably supporting and propelling a crane, a shovel, a dragline, or the like, Figure 2 is a side elevational view of the mechanism disclosed in Fig. 1, and Figure 3 is a fragmentary, vertical sectional view taken on line 3—3 of Fig. 1.

In the drawings, wherein for the purpose of illustration is shown the preferred embodiment of this invention, and first referring to Figs. 1 and 3, the reference character 5 designates the lower frame or base for a crane, a shovel, a dragline, or the like. This lower frame or base has conventionally mounted thereon a ring gear 6 which is formed on its upper surface to provide a beveled roller circle or race 7 which is engaged by the supporting rollers carried by the upper rotatable structure, not shown, of the crane, or the like, which is to be mounted on the lower frame or base 5. Fig. 3 discloses the center pin construction 8 which centers the upper rotatable structure on the lower frame or base. Power is transmitted from the prime mover of the upper rotatable structure to the lower frame or base for propelling and steering purposes by means of the upper gear 9, the center pin shaft 10, and the bevel pinion 11. As the detail features of construction of this center pin mechanism form no part of the present invention, the above description will be sufficient.

The several figures disclose the lower frame or base 5 as being mounted on a pair of traveling tread units which are designated in their entirety by the reference characters 12. Fig. 1 clearly illustrates the lower frame or base 5 as having projecting from opposite sides of the same the four rigid or integral lug projections or axles 13. The several figures disclose these lug projections as being of hollow or cored construction and as being of substantially square or rectangular formation in transverse vertical section. In other words, these lug projections or axles are provided with flat top and bottom surfaces 18 and 19, respectively, and flat side or vertical surfaces 20 and 21, respectively. These flat surfaces are formed respectively on the top, bottom, and side walls of the hollow lug projections or axles. Fig. 3 discloses the end wall 22 as being of greater thickness than the top, bottom, and side walls.

Each traveling tread unit 12 is clearly illustrated in Figs. 1 and 2 as including a side frame 23. Each one of these side frames 23 has formed therein two pockets 24 which are positioned to receive the lug projections or axles 13 of the lower frame or base 5.

Figs. 2 and 3 disclose these sprockets as being formed with flat upper and lower surfaces 25 and 26, respectively. These surfaces 25 and 26 are spaced from each other a distance which will permit a lug projection or axle to snugly fit between the same and so that the top and bottom surfaces 18 and 19 of the lug projection or axle will flatly and relatively tightly engage the pocket surfaces 25 and 26. This engagement of the top and bottom surfaces of the lug projections or axles and their pockets will prevent the lug projections or axles from moving relative to the side frame in vertical directions. In other words, the lower frame or base will not be permitted to partake of vertical movement relative to the traveling tread units.

Figs. 1 and 2 disclose the pockets 24 as having flat side wall surfaces 27 and 28 which are spaced from each other a distance greater than the distance between the side surfaces 20 and 21 of a lug projection or axle. In other words, each pocket 24 is wider in a horizontal direction than the width of the lug projection or axle positioned within the same. The lug projections or axles, therefore, may be shifted horizontally relative to the traveling tread side frames 23. To retain the side frames 23 against relative lateral movement with respect to the lower frame or base 5, the several figures disclose an end plate or casting 29 as being secured to each end face of the lug projections or axles 13 by means of the bolts 30 which are threaded into the relatively thick end walls 22 of said lug projections or axles. These end plates or castings 29 are of a proper size to engage the ends of the various walls of the pockets or so as to overlap and engage the margins of the pockets.

Of course, it is not intended that the lug projections or axles 13 be permitted to continuously shift or slide horizontally in the pockets and to prevent such relative movement, sets of shims 32 are positioned in each pocket between the side walls 20 and 21 of the lug projections or axles and the pockets, respectively. These shims are retained in place by bolts, or the like, 33 which are threaded into the lug projections or axles, as is clearly illustrated in Fig. 1. It will be appreciated that by employing shims of different thicknesses and by shifting the shims from one pocket to the other on one side of the lower frame or base, the traveling tread unit 12 on that side may be shifted horizontally relative to the lower frame or base. Different degrees of adjustment can be obtained by the use of the different thicknesses for the shims.

The tread belts for the traveling tread units 12 are made up of shoes 34 which are joined together by suitable articulating joints. Each tread belt is trained around its side frame 23 and over a take-up wheel 34 at one end of the side frame and a drive sprocket wheel 36 at the other end of the side frame. Intermediate these wheels 35 and 36, the tread belt is engaged by rollers 37. Each shoe 34 is provided with a pair of staggered drive lugs 38 which cooperate with the web portions of the take-up and drive sprocket wheels 35 and 36 and the flanges of the intermediate rollers 37 to keep the tread belt properly trained on the side frame. These drive lugs 38 also cooperate with driving teeth 39 formed on the sprocket wheel 36 to bring about a drive of the tread belt.

The take-up wheel 35 is supported by a shaft 40 which has its opposite ends received and journaled in bearings 41. Each bearing is provided with a take-up screw 42 by means of which the bearings 41 may be adjusted longitudinally of their side frame 23 to move the take-up wheel 35 for tightening or varying the tension on the tread belt trained thereover.

In Fig. 1, the drive sprocket 36 for one of the tread belts is illustrated as being carried by a drive shaft 43. Figs. 1 and 2 disclose this shaft as being journaled in split bearings 44 which are rigid with respect to the bifurcated end portions 45 of the side frame 23. These two figures clearly illustrate the inner half of each bearing as being formed integrally with a side frame part 45. The outer halves of these bearings are each detachably secured to the inner half by bolts, or the like, 46.

It will be appreciated that with this type of bearing construction, the tread belt drive shafts 43 may be correctly aligned with respect to their side frames during manufacture, and they cannot become misaligned at any time during use, except as a result of excessive wear on the part of the bearing or shaft surfaces. Also, by merely removing the outer halves of the bearings 44, the drive shafts may be readily removed or disconnected with respect to the side frames.

Fig. 1 discloses the tread belt drive shafts as having fastened thereto driven sprockets 47. These sprocket wheels have trained thereover the heavy duty roller chains 48. These chains extend to the lower frame or base 5 and, as is illustrated in Fig. 3, they are trained over the drive sprocket wheels 49 of the countershaft 50. Only one of these drive sprocket wheels 49 is illustrated in Fig. 3, but it is to be understood that a sprocket wheel is loosely carried by each end of the countershaft. These drive sprocket wheels 49 are provided with hub portions 51 having clutch members 52 secured to their inner ends. Clutch plates 53 are provided for the drive sprocket wheel clutch members 52. Each one of these clutch plates 53 is formed with a hub portion 54 that is splined to a countershaft section 55. Shifting forks, or the like, not shown, enter the annular grooves 56 of the clutch plate hubs 54 for accomplishing engaging and disengaging movements of the clutch plates 53 relative to the clutch members 52. By shifting these clutch plates 53 into and out of engagement with the clutch members 52, the drive sprockets 49 may be simultaneously or separately driven by the countershaft 52. This countershaft is driven by the bevel gear 57 which is splined to the shaft and which constantly meshes with the bevel pinion 11 of the center pin shaft 10.

It will be appreciated that the drive chains 48 for the tread belt drives will wear during use and will need to be tightened. These drive roller chains may be separably tightened or tensioned by adjusting their respective traveling tread side frames 23 relative to the lug projections or axles 13 on which the side frames are mounted. To effect tightening of a drive roller chain 48, it merely becomes necessary to remove the desired number of shims 32 from the pocket shown at the left in Fig. 1 and insert them in the pocket shown at the right of this figure. This transfer of shims will adjust the traveling tread side frame 23 to the right of Fig. 1.

It will be seen that with this traveling tread drive mechanism, the tread belt may be tightened or tensioned by means of the take-up screws 42, at one end of the side frames 23, without varying the tension of the drive chain 48 for that particular traveling tread unit. Also, by shifting one of the traveling tread side frames 23 relative to the lower frame or base 5, the drive chain 48 for that traveling tread unit may be tightened or tensioned without in any way affecting or changing the tension on the tread belt for that unit.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A traveling tread drive for cranes, shovels, draglines, or the like, comprising a lower frame or base, power transmission mechanism carried by the lower frame or base and including two drive chains adapted to be simultaneously or independently driven, a pair of traveling tread units each comprising a tread belt and a tread belt drive including a shaft having a sprocket wheel over which one of said drive chains is trained, means for mounting the lower frame or base on the traveling tread unit, and means for effecting bodily adjustment of each traveling tread unit longitudinally of the lower frame or base to vary the tension on the drive chain leading to said unit.

2. A traveling tread drive for cranes, shovels, drag-lines, or the like, comprising a lower frame or base, power transmission mechanism carried by the lower frame or base and including two drive chains adapted to be simultaneously or independently driven, a pair of traveling tread units each comprising a side frame, an endless tread belt trained around the frame, and a drive shaft for the tread belt having a sprocket wheel over which one of said drive chains is trained, means for connecting the lower frame or base to the side frames of the traveling tread units, and means for effecting bodily adjustment of each tread unit side frame longitudinally of the lower frame or base to vary the tension on the drive chain leading to said unit and while maintaining the same tension on the tread belt trained around said side frame.

3. A traveling tread drive for cranes, shovels, drag-lines, or the like, comprising a lower frame or base, power transmission mechanism carried by the lower frame or base and including two drive chains adapted to be simultaneously or independently driven, a pair of traveling tread units each comprising a side frame, an endless tread belt trained around the frame, and a drive shaft for the tread belt having a sprocket wheel over which one of said drive chains is trained, means for connecting the lower frame or base to the side frames of the traveling tread units, means for effecting bodily adjustment of each tread unit side frame relative to the lower frame or base to vary the tension on the drive chain leading to said unit and while maintaining the same tension on the tread belt trained around said side frame, and means for varying the tension on the traveling tread belt while maintaining a given position of adjustment of the tread unit side frame relative to the lower frame or base.

4. A traveling tread drive for cranes, shovels, drag-lines, or the like, comprising a lower frame or base, power transmission mechanism carried by the lower frame or base and including two drive chains adapted to be simultaneously or independently driven, a pair of traveling tread units each comprising a side frame, an endless tread belt trained around the frame, and a drive shaft for the tread belt having a sprocket wheel over which one of said drive chains is trained, and means for shifting the side frame longitudinally of the lower frame or base for varying the tension on the drive chain leading to said unit without varying the tension on the tread belt of said unit.

5. A traveling tread drive for cranes, shovels, drag-lines, or the like, comprising a lower frame or base, power transmission mechanism carried by the lower frame or base and including two drive chains adapted to be simultaneously or independently driven, a pair of traveling tread units each comprising a side frame, an endless tread belt trained around the frame, and a drive shaft for the tread belt having a sprocket wheel over which one of said drive chains is trained, means for shifting the side frame relative to the lower frame or base for varying the tension on the drive chain leading to said unit without varying the tension on the tread belt of said unit, and additional means for varying the tension on the tread belt for said unit without varying the tension on the drive chain leading to said unit.

6. A traveling tread drive for cranes, shovels, drag-lines, or the like, comprising a lower frame or base having a pair of lug projections or axles on each side thereof, power transmission mechanism carried by the lower frame or base and including two drive chains adapted to be simultaneously or independently driven, a pair of traveling tread units each comprising a side frame having a pair of pockets to movably receive the lug projections or axles on one side of the lower frame or base, an endless tread belt trained around the side frame, and a drive shaft for the tread belt having a sprocket wheel over which one of said drive chains is trained; and means for adjusting and holding the lug projections or axles relative to their side frame pockets to obtain the desired tension on the drive chain leading to said unit.

7. A traveling tread drive for cranes, shovels, drag-lines, or the like, comprising a lower frame or base having a pair of lug projections or axles on each side thereof, power transmission mechanism carried by the lower frame or base and including two drive chains adapted to be simultaneously or independently driven, a pair of traveling tread units each comprising a side frame having a pair of pockets to movably receive the lug projections or axles on one side of the lower frame or base, an endless tread belt trained around the side frame, and a drive shaft for the tread belt having a sprocket wheel over which one of said drive chains is trained; means for adjusting and holding the lug projections or axles relative to their side frame pockets to obtain the desired tension on the drive chain leading to said unit, and means for varying the tension on the tread belt of a unit independently of varying the tension on the drive chain for said unit.

8. A traveling tread drive for cranes, shovels, drag-lines, or the like, comprising a lower frame or base having a pair of lug projections or axles on each side thereof, a pair of traveling tread units each including a side frame having pockets to receive the pair of lug projections or axles on one side of the lower frame or base, said lug projections or axles and pockets being of such relative shapes and sizes as to permit the side frame to be adjusted longitudinally relative to the lug projections or axles but to prevent relative adjustments at right angles to the length of the side frame, means for removably retaining the lug projections or axles in their pockets, means for holding the lug projections or axles in different adjusted positions in their pockets, and a traveling tread belt trained over the side frame.

9. A traveling tread drive for cranes, shovels, draglines, or the like, comprising a lower frame or base having a pair of lug projections or axles on each side thereof, a pair of traveling tread units each including a side frame having pockets to receive the pair of lug projections or axles on one side of the lower frame or base, said lug projections or axles and pockets being of such relative shapes and sizes as to permit the side frame to be adjusted longitudinally relative to the lug projections or axles but to prevent relative adjustments at right angles to the length of the side frame, means for removably retaining the lug projections or axles in their pockets, means for holding the lug projections or axles in different adjusted positions in their pockets, a traveling tread belt trained over the side frame; and power transmission means extending between the lower frame or base and the side frame for driving the traveling tread belt, said power transmission means including a drive chain which may be tightened or loosened by the adjustment of the traveling tread side frame relative to the lug projections or axles.

10. A traveling tread drive for cranes, shovels, draglines, or the like, comprising a lower frame or base having a pair of lug projections or axles on each side thereof, a pair of traveling tread units each including a side frame having pockets to receive the pair of lug projections or axles on one side of the lower frame or base, said lug projections or axles and pockets being of such relative shapes and sizes as to permit the side frame to be adjusted longitudinally relative to the lug projections or axles but to prevent relative adjustment at right angles to the length of the side frame, means for removably retaining the lug projections or axles in their pockets, means for holding the lug projections or axles in different adjusted positions in their pockets, a traveling tread belt trained over the side frame, and means for adjusting the tension on the traveling tread belt while maintaining the lug projections or axles fixed with respect to their pockets; and power transmission means extending between the lower frame or base and the side frame for driving the traveling tread belt, said power transmission means including a drive chain which may be tightened or loosened by the adjustment of the traveling tread side frame relative to the lug projections or axles.

11. A traveling tread drive for cranes, shovels, draglines, or the like, comprising a lower frame or base, power transmission mechanism carried by the lower frame or base and including two drive chains adapted to be simultaneously or independently driven, a pair of traveling tread units each including a side frame, a traveling tread belt trained around the side frame, take-up means at one end of the side frame for varying the tension on the traveling tread belt, a drive sprocket wheel for the tread belt at the other end of the side frame, a shaft for the drive sprocket, stationary bearings for the drive sprocket shaft carried by the side frame, a second sprocket wheel carried by said drive sprocket shaft over which a drive chain of the power transmission is trained, and means for independently supporting the lower frame or base on said traveling tread unit side frames and for adjusting said side frames relative to said lower frame or base to tighten or loosen the said drive chains.

12. A traveling tread drive for cranes, shovels, draglines, or the like, comprising a lower frame or base, power transmission mechanism carried by the lower frame or base and including two drive chains adapted to be simultaneously or independently driven, a pair of traveling tread units each including a side frame, a traveling tread belt extending around the side frame, take-up means at one end of the side frame for varying the tension on the traveling tread belt, said take-up means including a wheel over which the belt is trained, a shaft for the wheel, bearings for the shaft, and take-up screws for adjusting the bearings, a drive sprocket wheel for the tread belt at the other end of the side frame, a shaft for the drive sprocket wheel, stationary bearings for the drive sprocket shaft carried by the side frame, a second sprocket wheel carried by said drive sprocket shaft over which a drive chain of the power transmission is trained, and means for independently supporting the lower frame or base on said traveling tread unit side frames and for adjusting said side frames relative to said lower frame or base to tighten or loosen the said drive chains.

13. A traveling tread drive for cranes, shovels, draglines, or the like, comprising a lower frame or base, power transmission mechanism carried by the lower frame or base and including two drive chains adapted to be simultaneously or independently driven, a pair of traveling tread units each including a side frame, a traveling tread belt trained around the side frame, take-up means at one end of the side frame for varying the tension on the traveling tread belt, a drive sprocket wheel for the tread belt at the other end of the side frame, a shaft for the drive sprocket, stationary bearings for the drive sprocket shaft carried by the side frame, a second sprocket wheel carried by said drive sprocket shaft over which a drive chain of the power transmission is trained, means for independently supporting the lower frame or base on said traveling tread unit side frames and for adjusting said side frames relative to said lower frame or base to tighten or loosen the said drive chains, said supporting and adjusting means including lug projections or axles on each side of the lower frame or base, pockets formed in said side frames to movably receive the lug projections or axles, and means for holding the lug projections or axles in different adjusted positions in said pockets.

14. A traveling tread drive for cranes, shovels, draglines, or the like, comprising a lower frame or base, power transmission mechanism carried by the lower frame or base and including two drive chains adapted to be simultaneously or independently driven, a pair of traveling tread units each including a side frame, a traveling tread belt trained around the side frame, take-up means at one end of the side frame for varying the tension on the traveling tread belt, a drive sprocket wheel for the tread belt at the other end of the side frame, a shaft for the drive sprocket, stationary bearings for the drive sprocket shaft carried by the side frame, a second sprocket wheel carried by said drive sprocket shaft over which a drive chain of the power transmission is trained, means for independently supporting the lower frame or base on said traveling tread unit side frames and for adjusting said side frames relative to said lower frame or base to tighten or loosen the said drive chains, said supporting and adjusting means including lug projections or axles on each side of the lower frame or base, pockets formed in said side frames to movably receive the lug projections or axles, and a plurality of different sized shims for holding the lug projections or axles in different adjusted positions in said pockets.

15. A traveling tread drive for cranes, shovels, draglines, or the like, comprising a lower frame or base having a pair of lug projections or axles on each side thereof, a pair of traveling tread units each including a side frame having pockets to receive the pair of lug projections or axles on one side of the lower frame or base, said lug projections or axles having flat top and bottom surfaces and said pockets having flat top and bottom surfaces which are spaced from each other so as to engage the flat surfaces of the lug projections or axles in a manner to permit relative horizontal sliding movement but to prevent relative vertical movement, said pockets being of greater dimension horizontally than said lug projections or axles so as to allow for said sliding movement, means for removably retaining the lug projections or axles in their pockets, means for holding the lug projections or axles in different adjusted position in their pockets, and a traveling tread belt trained over the side frame.

16. A traveling tread drive for cranes, shovels, draglines, or the like, comprising a lower frame or base having a pair of lug projections or axles on each side thereof, a pair of traveling tread units each including a side frame having pockets to receive the pair of lug projections or axles on one side of the lower frame or base, said lug projections or axles having flat top and bottom surfaces and said pockets having flat top and bottom surfaces which are spaced from each other so as to engage the flat surfaces of the lug projections or axles in a manner to permit relative horizontal sliding movement but to prevent relative vertical movement, said pockets being of greater dimension horizontally than said lug projections or axles so as to allow for said sliding movement, means for removably retaining the lug projections or axles in their pockets, means for holding the lug projections or axles in different adjusted positions in their pockets, a traveling tread belt trained over the side frame; and power transmission means extending between the lower frame or base and the side frame for driving the traveling tread belt, said power transmission means including a drive chain which may be tightened or loosened by the adjustment of the traveling tread side frame relative to the lug projections or axles.

17. In a traveling tread drive for cranes, shovels, draglines, or the like, a lower frame or base, a pair of lug projections or axles extending from one side thereof, a traveling tread side frame having a pair of pockets of a size to loosely receive said pair of lug projections or axles, and a plurality of shims divided into two combinations or groups providing either the same or different combined thicknesses and insertable one group in each pocket to hold the lug projections or axles in predetermined relative positions in said pockets, said positions being relatively variable by changing the relative combined thicknesses of the two combinations or groups.

18. In a traveling tread drive for cranes, shovels, draglines, or the like, a lower frame or base, a pair of lug projections or axles extending from one side thereof, a traveling tread side frame having a pair of pockets of a size to loosely receive said pair of lug projections or axles, a plurality of shims divided into two combinations or groups providing either the same or different combined thicknesses and insertable one group in each pocket to hold the lug projections or axles in predetermined relative positions in said pockets, said positions being relatively variable by changing the relative combined thicknesses of the two combinations or groups, and an end plate secured to each lug projection or axle and overlying the outer end of its pocket to prevent withdrawal of the lug projection or axle.

19. A traveling tread drive for cranes, shovels, draglines, or the like, comprising a lower frame or base, power transmission mechanism carried by the lower frame or base and including two drive chains adapted to be simultaneously or independently driven, a pair of traveling tread units each comprising a side frame, an endless tread belt trained around the frame, and a drive shaft for the tread belt mounted on the side frame for rotary movement only and having a sprocket wheel over which one of said drive chains is trained, means for connecting the lower frame or base to the side frames of the traveling tread unit, means for bodily shifting either traveling tread unit relative to the lower frame or base for varying the tension on the drive chain leading to said unit while maintaining the same tension on the tread belt trained around said tread unit side frame, and means for varying the tension on the traveling tread belt while maintaining the same tension on the drive chain leading to said unit.

20. A traveling tread drive for cranes, shovels, draglines, or the like, comprising a lower frame or base, power transmission mechanism carried by the lower frame or base and including two drive chains adapted to be simultaneously or independently driven, a pair of traveling tread units each comprising a side frame, an endless tread belt trained around the frame, and a drive shaft for the tread belt mounted on the side frame for rotary movement only and having a sprocket wheel over which one of said drive chains is trained, means for connecting the lower frame or base to the side frames of the traveling tread units, and means for bodily shifting either traveling tread unit relative to the lower frame or base for varying the tension on the drive chain leading to said unit while maintaining the same tension on the tread belt trained around said tread unit side frame.

21. In a traveling tread drive for cranes, shovels, draglines, or the like, a lower frame or base, a pair of rigidly interconnected lug projections or axles extending from one side thereof, a traveling tread side frame having a pair of pockets of a shape and size to receive said pair of lug projections or axles and to hold them against vertical movement relative to said side frames while permitting them to move horizontally in opposite directions, and means insertable in said pockets between only one of their vertical sides and the opposed sides of the projections or axles, said insertable means of the two pockets collectively holding the lug projections or axles against horizontal movement in either direction in said pockets.

22. In a traveling tread drive for cranes, shovels, draglines, or the like, a lower frame or base, a pair of rigidly interconnected lug projections or axles extending from one side thereof, a traveling tread side frame having a pair of pockets of a shape and size to receive said pair of lug projections or axles and to hold them against vertical movement relative to said side frame while permitting them to move horizontally in opposite directions, means insertable in said pockets between only one of their vertical sides and the opposed sides of the projections or axles, said means insertable in both pockets collectively acting to hold the lug projections or axles against horizontal movement in either direction in said pockets.

HILMER N. EKBOM.